United States Patent
Nakashima et al.

(10) Patent No.: US 11,493,431 B2
(45) Date of Patent: Nov. 8, 2022

(54) OPTICAL MEASUREMENT SYSTEM, OPTICAL CELL, AND OPTICAL MEASUREMENT METHOD

(71) Applicants: National University Corporation Kumamoto University, Kumamoto (JP); Ushio Denki Kabushiki Kaisha, Tokyo (JP)

(72) Inventors: Yuta Nakashima, Kumamoto (JP); Kinichi Morita, Tokyo (JP)

(73) Assignees: National University Corporation Kumamoto University, Kumamoto (JP); Ushio Denki Kabushiki Kaisha, Tokyo (JP)

( * ) Notice: Subject to any disclaimer, the term of this patent is extended or adjusted under 35 U.S.C. 154(b) by 580 days.

(21) Appl. No.: 16/490,880

(22) PCT Filed: Jan. 19, 2018

(86) PCT No.: PCT/JP2018/001627
§ 371 (c)(1),
(2) Date: Sep. 3, 2019

(87) PCT Pub. No.: WO2018/159149
PCT Pub. Date: Sep. 7, 2018

(65) Prior Publication Data
US 2020/0124522 A1    Apr. 23, 2020

(30) Foreign Application Priority Data

Mar. 3, 2017 (JP) .............................. JP2017-041119

(51) Int. Cl.
*G01N 21/03* (2006.01)
*G01N 21/05* (2006.01)
(Continued)

(52) U.S. Cl.
CPC ............ *G01N 21/0303* (2013.01); *G01J 3/42* (2013.01); *G01N 21/05* (2013.01); *G01N 21/33* (2013.01)

(58) Field of Classification Search
CPC ...................................................... G01N 3/42
See application file for complete search history.

(56) References Cited

U.S. PATENT DOCUMENTS 8,189,196 B2 * 5/2012 Belz ..................... C07D 487/04
356/420
9,541,531 B2 * 1/2017 Goto ....................... G01N 30/74
(Continued)

FOREIGN PATENT DOCUMENTS

EP      1 284 417 A2    2/2003
JP    2000-346798 A    12/2000
(Continued)

OTHER PUBLICATIONS

An Office Action; "Notification of Reasons for Refusal," issued by the Japanese Patent Office dated Jul. 7, 2020, which corresponds to Japanese Patent Application No. 2017-041119 and is related to U.S. Appl. No. 16/490,880 with English language translation.
(Continued)

*Primary Examiner* — Rebecca C Bryant
(74) *Attorney, Agent, or Firm* — Studebaker & Brackett PC

(57) ABSTRACT

A purpose of the present invention is to provide an optical measurement system or the like suitable for optical measurement of nucleic acids, proteins, etc.
In a first aspect of the present invention, an optical measurement system that provides optical sample measurement comprises: an optical cell having a sample-holding hollow portion; and a light source unit that emits broadband light containing first and second light to the optical cell. The optical cell includes: a first light guide where light passes
(Continued)

through a first transparent portion that transmits the first light more readily than the second light and the hollow portion without passing through a second transparent portion that transmits the second light more readily than the first light; and a second light guide that differs from the first light guide, in which light passes through the second transparent portion and the hollow portion without passing through the first transparent portion.

5 Claims, 6 Drawing Sheets

(51) Int. Cl.
*G01N 21/33* (2006.01)
*G01J 3/42* (2006.01)

(56) References Cited

U.S. PATENT DOCUMENTS

| | | | |
|---|---|---|---|
| 2003/0034454 A1 | 2/2003 | Nomura et al. | |
| 2005/0101025 A1* | 5/2005 | Ho | B01L 3/0275 422/400 |

FOREIGN PATENT DOCUMENTS

| | | | | |
|---|---|---|---|---|
| JP | 2000346798 A | * | 12/2000 | ............. G01N 21/05 |
| JP | 2003-057178 A | | 2/2003 | |
| JP | 2009-530642 A | | 8/2009 | |
| JP | 4982386 B2 | | 7/2012 | |
| JP | 2013-145207 A | | 7/2013 | |
| JP | 2013145207 A | * | 7/2013 | |
| JP | 2018-040641 A | | 3/2018 | |
| WO | 2006/086459 A2 | | 8/2006 | |
| WO | 2007/111838 A2 | | 10/2007 | |

OTHER PUBLICATIONS

International Preliminary Report On Patentability and Written Opinion issued in PCT/JP2018/001627; dated Sep. 3, 2019.

International Search Report issued in PCT/JP2018/001627; dated Apr. 17, 2018.

Written Opinion issued in PCT/JP2018/001627; dated Apr. 17, 2018.

* cited by examiner (a)

(b)

OPTICAL MEASUREMENT SYSTEM, OPTICAL CELL, AND OPTICAL MEASUREMENT METHOD

TECHNICAL FIELD

The present invention relates to an optical measurement system configured to provide optical measurement of a sample, an optical cell, and an optical measurement method.

BACKGROUND ART

In the life science field, there is a great demand for photoanalysis using ultraviolet light (which will also be referred to as "UV light" hereafter). Examples of such a photoanalysis method using UV light include an absorbance measurement method, a photoinduction (laser induction) fluorescence measurement method, etc.

For example, the purity of a nucleic acid material can be measured by absorbance measurement using UV light. Nucleic acids such as DNA, RNA, oligonucleotides, etc., readily absorb UV light at wavelengths in the vicinity of 260 nm. This is because the four kinds of bases (adenine, guanine, cytosine, thymine) that form such nucleic acid materials have maximum absorption wavelengths in a wavelength range from 250 to 270 nm. In contrast, protein materials readily absorb UV light at wavelengths in the vicinity of 280 nm. This is because, from among the amino acids included in protein materials, benzene rings included in aromatic compounds such as tryptophan, tyrosine, phenylalanine, etc. each have an absorption peak in the vicinity of 280 nm.

Accordingly, the absorbance ratio between 260 nm and 280 nm ($A_{260}/A_{280}$) can be used as an index that indicates the purity of a nucleic acid sample. In a case in which a nucleic acid sample is contaminated with proteins, such a nucleic acid sample readily absorbs 280-nm wavelength light, which lowers the $A_{260}/A_{280}$ value. As a judgment standard, in a case in which a DNA sample is measured, when the $A_{260}/A_{280}$ value is equal to or larger than 1.8, judgement is made that the DNA sample has high purity. In a case in which an RNA sample is measured, when the $A_{260}/A_{280}$ value is equal to or larger than 2.0, judgement is made that the RNA sample has high purity.

Typically, the amount of such a nucleic acid sample, protein sample, or the like is minuscule. In view of this, as a microscale sample optical measurement for a sample (liquid sample) having a volume on the microliter order, an optical measurement method and an optical measurement apparatus are known in which a sample held in a cylindrical form using surface tension is measured using light (Patent documents 1 and 2). By employing such an apparatus, this provides optical measurement using ultraviolet light without a need to hold the sample in an optical cell.

CITATION LIST

Patent Literature

[Patent Document 1]
Japanese Patent No. 4,982,386
[Patent Document 2]
Japanese Patent Application Laid Open No. 2009-530642

SUMMARY OF INVENTION

Technical Problem

However, in a case of supporting light measurement employing the technique disclosed in Patent document 1 or 2, there is a need to supply a sample to a measurement unit of an apparatus using a pipette for every measurement. That is to say, such a measurement sample cannot be prepared beforehand.

The present invention has been made in view of such a situation. Accordingly, it is a purpose of the present invention to provide an optical measurement system or the like that is suitable for optical measurement of a nucleic acid sample, a protein sample, etc.

Solution of Problem

A first aspect of the present invention relates to an optical measurement system configured to perform optical measurement of a sample. The optical measurement system comprises: an optical cell having a hollow portion for holding the sample; and a light source unit that emits a broadband light including a first light and a second light to the optical cell. The optical cell comprises: a first light guide in which a light passes through a first transparent portion that allows the first light to pass through more readily than the second light and the hollow portion without passing through a second transparent portion that allows the second light pass through more readily than the first light; and a second light guide that differs from the first light guide, in which a light passes through the second transparent portion and the hollow portion without passing through the first transparent portion.

A second aspect of the present invention also relates to the optical measurement system according to the first aspect. The optical cell is configured to have a circumferential wall portion that surrounds the hollow portion. The circumferential wall portion is configured to have, as a portion thereof: a dual-wavelength-transparent portion that allows the first light and the second light to pass through; the first transparent portion; and the second transparent portion. The first light guide is configured such that a light sequentially passes through in a direction from the light source unit in an order of the first transparent portion, the hollow portion, and the dual-wavelength-transparent portion. The second light guide is configured such that a light sequentially passes through in a direction from the light source unit in an order of the second transparent portion, the hollow portion, and the dual-wavelength-transparent portion.

A third aspect of the present invention also relates to the optical measurement system according to the first aspect. The optical cell is configured to have a circumferential wall portion that surrounds the hollow portion. The circumferential wall portion is configured to have, as a portion thereof: a first opening and a second opening that connect the hollow portion to an exterior portion. The first light guide is configured such that a light sequentially passes through in a direction from the light source unit in an order of the first opening, the hollow portion, and the first transparent portion. The second light guide is configured such that a light sequentially passes through in a direction from the light source unit in an order of the second opening, the hollow portion, and the second transparent portion.

A fourth aspect of the present invention also relates to the optical measurement system according to any one of the first aspect through the third aspect. The optical cell further comprises: a first reference light hollow portion that differs from the hollow portion; a second reference light hollow portion that differs from both the hollow portion and the first reference light hollow portion; a first reference transparent portion that differs from the first transparent portion and configured to allow the first light to pass through more readily than the second light; a second reference transparent portion that differs from the second transparent portion and configured to allow the second light to pass through more readily than the first light; a first reference light guide configured to have an optical path length that is the same as that of the first light guide; and a second reference light guide configured to have an optical path length that is the same as that of the second light guide. The first reference light guide is configured such that a light passes through the first reference light hollow portion and the first reference transparent portion. The second reference light guide is configured such that a light passes through the second reference light hollow portion and the second reference transparent portion. The distance which a light passes through the first transparent portion is equal to the distance which a light passes through the first reference transparent portion. The distance which a light passes through the second transparent portion is equal to the distance which a light passes through the second reference transparent portion.

A fifth aspect of the present invention also relates to the optical measurement system according to any one of the first aspect through the fourth aspect. The optical measurement system comprises an optical shutter between the light source unit and a photodetector unit configured to detect a light emitted from the optical cell. The optical shutter is configured to control the light so as to allow the light to pass through or otherwise so as to block the light.

A sixth aspect of the present invention also relates to the optical measurement system according to any one of the first aspect through the fifth aspect. The first light is a light having a wavelength of 260 nm. The second light is a light having a wavelength of 280 nm.

A seventh aspect of the present invention relates to an optical cell configured to have a hollow portion for holding an optical measurement target sample. The optical cell comprises: a first light guide configured such that a light passes through a first transparent portion that allows a first light to pass through more readily than a second light and the hollow portion without passing through a second transparent portion that allows the second light to pass through more readily than the first light; and a second light guide configured such that a light passes through the second transparent portion and the hollow portion without passing through the first transparent portion.

An eighth aspect of the present invention relates to an optical measurement method employed in an optical measurement system for performing optical measurement of a sample. The optical measurement system comprises: an optical cell having a hollow portion for holding the sample; a light source unit that emits a broadband light containing a first light and a second light to the optical cell; a photodetector unit that detects a light emitted from the optical cell; a first light guide in which a light passes through a first transparent portion that allows the first light to readily pass through more readily than the second light and the hollow portion without passing through a second transparent portion that allows the second light to more readily pass through than the first light; and a second light guide that differs from the first light guide, in which a light passes through the second transparent portion and the hollow portion without passing through the first transparent portion. The optical measurement method comprises detection supported by the photodetector unit in which the light that has passed through the first light guide and the light that has passed through the second light guide are separately detected.

Advantageous Effects of Invention

With each aspect of the present invention, this arrangement only requires light to be emitted from a single light source to a sample held in a single optical cell to acquire optical measurement results with respect to two wavelengths. Accordingly, the present invention is effectively applied to a case such as DNA purity measurement or the like that requires optical measurement of a small sample amount using two wavelengths of light.

Instead of injecting the sample into the optical measurement apparatus itself, the sample is injected into a hollow portion of an optical cell. Accordingly, by preparing multiple optical cells, this arrangement allows the user to inject the samples into the multiple optical cells in a batch manner. This allows the burden on the user performing the measurement to be reduced as compared with an arrangement that requires the user to inject the sample for every optical measurement.

Furthermore, with the optical measurement apparatus described in Patent document 1 or 2, the sample is mounted with a large exposure area, leading to the potential for the concentration of the sample to change due to evaporation. Moreover, this constantly changes the optical path via which transmitted light passes through the sample in the optical measurement, leading to the potential to cause difficulty in providing stable optical measurement. In contrast, with the present invention, the sample is injected into the hollow portion of the optical cell. Accordingly, this arrangement involves almost no effect of evaporation even in a case in which a small amount of a liquid sample is to be measured. This provides stable optical measurement.

Furthermore, with the optical measurement apparatus described in Patent document 1 or 2, in a case in which the measurement is to be executed multiple times, there is a need to wipe off the sample mounted on the measurement unit every time each measurement is completed. Accordingly, with such an arrangement, in the second and subsequent measurements, there is the potential for variation of the concentration or the occurrence of contamination in the sample due to contamination with the previous measurement sample. In contrast, with the present invention, such an arrangement only requires a given optical cell to be replaced by another optical cell, thereby allowing the occurrence of variation of concentration and contamination in the sample to be suppressed in a simple manner.

With the second and the third aspects of the present invention, this arrangement only requires a given optical cell to be replaced by another optical cell having a portion that is transparent to a different wavelength to change the measurement wavelength without a need to change the settings for the light source and the photodetector unit. Furthermore, each optical cell itself is provided with the first-wavelength-transparent portion and the second-wavelength-transparent portion. Accordingly, the optical measurement apparatus that forms the optical measurement system requires no optical element such as a diffraction grating or the like having a dispersing function or a wavelength-selecting function. This allows the optical measurement apparatus to have a compact size.

Furthermore, with the third aspect of the present invention, this arrangement requires no dual-wavelength-transparent portion as compared with the second aspect. Accordingly, this arrangement allows the distance which light passes through the sample for each of the first light guide and the second light guide to be increased and/or allows the optical cell to have a compact size.

With the fourth aspect of the present invention, this arrangement allows the blank measurement in addition to the dual-wavelength measurement in a state in which a given optical cell is set after the sample is injected into the optical cell.

With the fifth aspect of the present invention, this arrangement is capable of controlling the input of the light from the light source to the first light guide and the second light guide.

With the sixth aspect of the present invention, an optical measurement system that is suitable for DNA purity measurement can be provided.

DESCRIPTION OF EMBODIMENTS

Description will be made below with reference to the drawings regarding examples of an optical measurement system according to the present invention. Description will be made below regarding an example in which UV light having a wavelength of 260 nm and UV light having a wavelength of 280 nm (an example of "first light" and "second light" in the present claims) are emitted to a sample including DNA and protein so as to perform absorbance measurement.

Example 1

Figure 1:
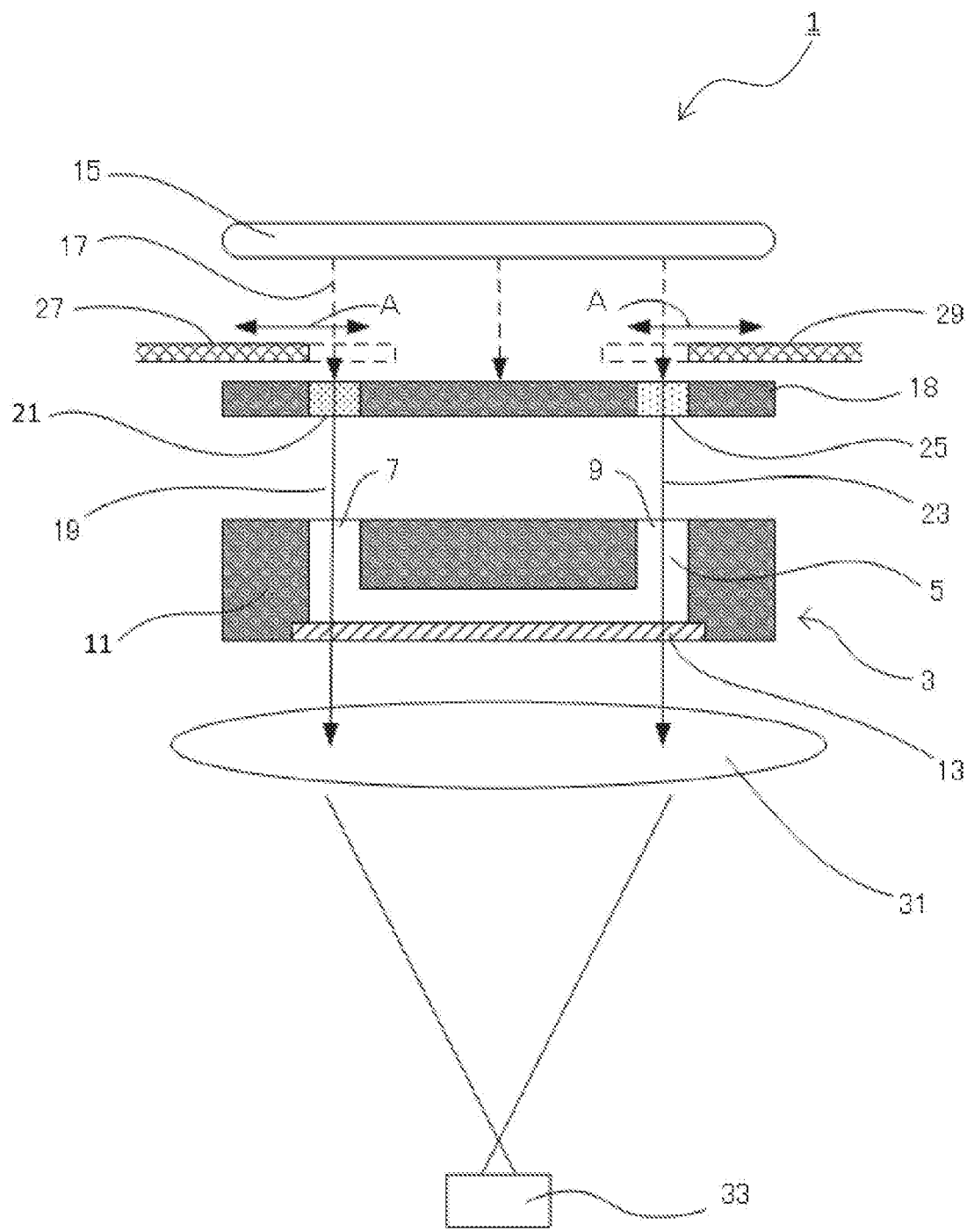
FIG. 1 is a diagram showing a configuration of an optical measurement system (example 1) according to the present invention.

FIG. 1 is a diagram showing an example of a configuration of an optical measurement system 1 comprising an optical measurement apparatus and an optical measurement microchip according to the present invention. An optical measurement microchip 3 (an example of an "optical cell" described in the present claims) that forms the optical measurement system 1 has a flow path 5 (an example of a "hollow portion" described in the present claims) that is capable of holding a measurement sample (an example of a "sample" described in the present claims) in its internal space. The flow path 5 has an inlet 7 (an example of a "first opening" described in the present claims) that allows the measurement sample to be supplied and an outlet 9 (an example of a "second opening" described in the present claims) that allows the measurement sample to be discharged. A microchip main body 11 is formed of a silicone resin such as PDMS or the like, for example. The silicone resin that forms the microchip main body 11 contains a pigment that is capable of absorbing stray light that occurs when the light flows through the flow path 5. As such a pigment, carbon black is employed, for example. A UV-transparent window portion 13 (an example of a "dual-wavelength-transparent portion" described in the present claims) formed of a silicone resin that is transparent to UV (ultraviolet) light is arranged on the bottom side of the flow path 5, for example. As a UV-transparent silicone resin, PDMS is employed, for example.

In a case in which 260-nm ultraviolet light and 280-nm ultraviolet light are emitted to a measurement sample held within the flow path 5 of the optical measurement microchip 3, one from among the 260-nm ultraviolet light and the 280-nm ultraviolet light is emitted to the inlet 7 of the flow path 5. The other ultraviolet light is emitted to the outlet 9 of the flow path 5. The 260-nm ultraviolet light and the 280-nm ultraviolet light thus respectively input to the inlet 7 and the output 9 pass through the measurement sample arranged within the flow path 5, and are emitted to the exterior via the UV-transparent window portion 13. That is to say, the inlet 7 and the output 9 of the optical measurement microchip 3 are arranged such that they face a part of the UV-transparent silicone resin portion via the flow path 5.

The ultraviolet light having a wavelength of 260 nm and the ultraviolet light having a wavelength of 280 nm are emitted to the inlet 7 and the outlet 9 of the optical measurement microchip 3 by means of a configuration described blow, for example. As shown in FIG. 1, light including the UV light is emitted from a light source (an example of a "light source unit" described in the present claims). As such a light source, a xenon lamp, a deep UV lamp, or the like, may be employed, for example. Description will be made below regarding an example in which such a lamp as described above is employed as a light source that emits light including UV light, which will be referred to as a "UV lamp 15" hereafter.

A wavelength selection member 18 is arranged between the UV lamp 15 and the inlet 7 and the outlet 9 of the optical measurement microchip 3 in order to selectively transmit 260-nm wavelength light and 280-nm wavelength light from among light including UV light 17 (an example of "broadband light" described in the present claims) emitted from the UV lamp 15. The wavelength selection member 18 is configured as a shading substrate including a first wavelength (260-nm) selection portion 21 (an example of a "first transparent portion" described in the present claims) configured to selectively transmit light 19 (an example of "first light" described in the present claims) having a first wavelength (260-nm) and a second wavelength (280-nm) selection portion 25 (an example of a "second transparent portion" described in the present claims) configured to selectively transmit light 23 (an example of "second light" described in the present claims) having a second wavelength (280 nm).

In an example 1, the wavelength selection member 18 is arranged at a position such that, when light is emitted from the UV lamp 15 to the first wavelength selection portion 21, the first wavelength (260-nm) light 19 that has been selectively transmitted is input to the inlet 7 of the optical measurement microchip 3, and such that, when light is emitted from the UV lamp 15 to the second wavelength selection portion 25, the second wavelength (280-nm) light 23 that has been selectively transmitted is input to the outlet 9 of the optical measurement microchip 3.

Furthermore, a first shutter 27 (an example of an optical shutter described in the present claims) is arranged between the UV lamp 15 and the wavelength selection member 18, which is configured to block the input of the light from the UV lamp 15 to the first wavelength selection portion 21 of the wavelength selection member 18. In the same manner, a second shutter 29 (an example of an optical shutter described in the present claims) is arranged so as to block the input of the light from the UV lamp 15 to the second wavelength selection portion 25 of the wavelength selection member 18. The first shutter 27 and the second shutter 29 are each configured to be moved, by means of an unshown shutter drive mechanism, in the direction indicated by the arrow (A) shown in FIG. 1 so as to switch the state between the shielded state and the unshielded state.

The shading substrate that forms the wavelength selection member 18 except for the first wavelength selection portion 21 and the second wavelength selection portion 25 may preferably be configured to provide at least a function of blocking the light emitted from the UV lamp 15. Furthermore, the substrate is preferably be configured to provide little reflection with respect to the light emitted from the UV lamp 15. Accordingly, the substrate is formed of a silicone resin containing a pigment having a function of absorbing the light emitted from the UV lamp 15, for example. Examples of such a pigment to be employed include carbon black.

It should be noted that the pigment-containing silicone resin that forms the microchip main body 11 and the UV (ultraviolet light) transparent silicone resin that forms the UV-transparent window portion 13 are preferably configured as the same material or otherwise as materials having almost the same refractive index. This provides a refractive ratio difference of almost zero at an interface between the microchip main body 11 and the UV-transparent window portion 13. Such an arrangement is capable of suppressing the reflection and scattering of stray light or the like at an interface between the resin members.

The light that has been transmitted through the UV-transparent window portion 13 is focused by means of a focusing mechanism such as a focusing lens 31 or the like, and is introduced to a measurement sensor unit 33 (an example of a "photodetector unit" described in the present claims). It should be noted that, in a case in which ultraviolet light that passes through the UV-transparent window portion 13 has wavelengths of 260 nm and 280 nm, and in a case in which the focusing lens 31 is employed, this involves chromatic aberration due to the wavelength difference, leading to a difference in the image formation position along the optical axis. However, in a case of measuring absorbance, the light intensity of the measurement light is to be measured. Accordingly, the measurement light is not necessarily required to form an image on the light-receiving face of the measurement sensor unit 33. Furthermore, the difference between the two wavelengths of UV light is small, i.e., is only 20 nm, which involves only small chromatic aberration. Accordingly, with the optical system as shown in FIG. 1, such chromatic aberration has only a small effect on the measurement of the intensities of the 260-nm wavelength light and the 280-nm wavelength light supported by the measurement sensor unit 33.

Next, description will be made regarding an example of a method for measuring DNA purity using the optical measurement system shown in FIG. 1 with a DNA-containing solution as a liquid sample. First, the optical measurement microchip 3 is prepared in a state in which a DNA-containing solution has been injected into the flow path 5 (Step 1). Subsequently, the microchip 3 in this state is set to a measurement position of the optical measurement apparatus (Step 2). The optical system of the optical measurement apparatus is arranged beforehand such that, when the microchip 3 is set to a predetermined position, the first wavelength (=260 nm) light 19 that has passed through the wavelength selection member 18 is input to the inlet 7 of the microchip 3 and the second wavelength (=280 nm) light 23 that has passed through the wavelength selection member 18 is input to the outlet 9 of the microchip 3, and such that the 260-nm wavelength light and the 280-nm wavelength light that have passed through the UV-transparent window portion 13 of the microchip 3 are focused to the light-receiving portion of the measurement sensor unit 33 by means of the focusing lens 31.

The first shutter 27 is inserted into a space between the UV lamp 15 and the first wavelength selection portion 21 of the wavelength selection member 18, and the second shutter 29 is inserted into a space between the UV lamp 15 and the second wavelength selection portion 25 of the wavelength selection member 18, by means of an unshown shutter driving mechanism (Step 3). Electric power is supplied to the UV lamp 15 by means of an unshown power supply so as to turn on the UV lamp 15 (Step 4). The first shutter 27 is retracted by means of the shutter driving mechanism from the space between the UV lamp 15 and the first wavelength selection portion 21 of the wavelength selection member 18 (Step 5). As a result, the 260-nm wavelength light, i.e., the first wavelength light 19, is emitted to the liquid sample held within the microchip 3. After the 260-nm wavelength light is absorbed in part and dimmed by the liquid sample, the 260-nm wavelength light thus dimmed is emitted via the UV-transparent window portion 13. In Step 5, the 260-nm wavelength light emitted via the UV-transparent window portion 13 is input to the focusing lens 31 configured as a focusing mechanism. The 260-nm wavelength light thus input is focused and input to the measurement sensor unit 33 by means of the focusing lens 31. The measurement sensor unit 33 measures the intensity of the 260-nm wavelength light (Step 6).

Subsequently, the first shutter 27 is inserted again into the space between the UV lamp 15 and the first wavelength selection portion 21 of the wavelength selection member 18 by means of the shutter driving mechanism (Step 7). Subsequently, the second shutter 29 is retracted by means of the shutter driving mechanism from the space between the UV lamp 15 and the second wavelength selection portion 25 of the wavelength selection member 18 (Step 8). As a result, the 280-nm wavelength light, i.e., the second wavelength light 23, is emitted to the liquid sample held within the microchip 3. After the 280-nm wavelength light is absorbed in part and dimmed by the liquid sample, the 280-nm wavelength light thus dimmed is emitted via the UV-transparent window portion 13. In Step 8, the 280-nm wavelength light emitted via the UV-transparent window portion 13 is input to the focusing lens 31 configured as a focusing mechanism. The 280-nm wavelength light thus input is focused and input to the measurement sensor unit 33 by means of the focusing lens 31. The measurement sensor unit 33 measures the intensity of the 280-nm wavelength light (Step 9). The DNA purity is measured based on the following Expression (1) using the transmitted light intensity of the 260-nm wavelength light measured in Step 6 (which will be referred to as "$A_{260}$") and the transmitted light intensity of the 280-nm wavelength light measured in Step 8 (which will be referred to as "$A_{280}$") (Step 10).

[Expression 1]

$$\text{DNA purity} = A_{260}/A_{280} \tag{1}$$

DNA readily absorbs UV light in the vicinity of 260 nm. In contrast, proteins readily absorb UV light in the vicinity of 280 nm. Accordingly, the ratio between $A_{260}$ and AS280 can be employed as an index that represents DNA purity. In a case in which a DNA sample is contaminated with proteins, the DNA sample readily absorbs 280-nm wavelength light, which lowers the $A_{260}/A_{280}$ value. Typically, when the $A_{260}/A_{280}$ value is equal to or larger than 1.8, judgement is made that there is little protein contamination, and that the DNA sample has high purity.

Also, an unshown control unit may support the operation of the power supply configured to supply electric power to the UV lamp 15, the operation of the shutter driving mechanism configured to insert/retract the first shutter 27 into/from the space between the UV lamp 15 and the first wavelength selection portion 21 and to insert/retract the second shutter 29 into/from the space between the UV lamp 15 and the second wavelength selection portion 25, the data processing based on the transmitted light intensities measured by the measurement sensor unit 33, and the like.

It should be noted that, in actuality, before executing Steps 1 through 10, the flow path 5 formed in the microchip 3 is washed. After the flow path 5 is washed, a solvent including no DNA (which will also be referred to as a "reference liquid" hereafter) is injected into the flow path 5, and the same procedure as that represented by Steps 2 through 9 is executed so as to measure the transmitted light intensities of the 260-nm wavelength light and the 280-nm wavelength light, i.e., blank light intensities, that have passed through the reference liquid. With such an arrangement, the blank light intensities thus obtained are used to correct the transmitted light intensity of the 260-nm wavelength light measured in Step 6 and the 280-nm wavelength light measured in Step 8.

The optical measurement apparatus according to the present invention employs a method in which a liquid sample is held within the flow path 5 of the optical measurement microchip 3. This arrangement allows the user to prepare such a measurement sample beforehand. That is to say, this arrangement allows the microchip 3 to be prepared beforehand in a state in which a liquid sample has been injected into the flow path 5. Also, this allows the user to prepare such multiple microchips as necessary. Such an arrangement allows the burden on the user performing the measurement to be reduced.

Furthermore, this arrangement employs a method in which a measurement sample is injected into the flow path 5 of the optical measurement microchip 3. Accordingly, this arrangement involves almost no effect of evaporation even in a case in which a small amount of the liquid sample is to be measured. This provides stable optical measurement.

In a case in which the optical measurement is performed for multiple samples, the user is only required to prepare such multiple microchips 3 in a state in which a measurement sample has been injected into the flow path 5. Accordingly, unlike conventional techniques, the user is not required to wash the measurement unit for every measurement. This ensures that each optical measurement is not affected by the previous measurement, thereby providing the optical measurement with high reliability.

Example 2

Figure 2:
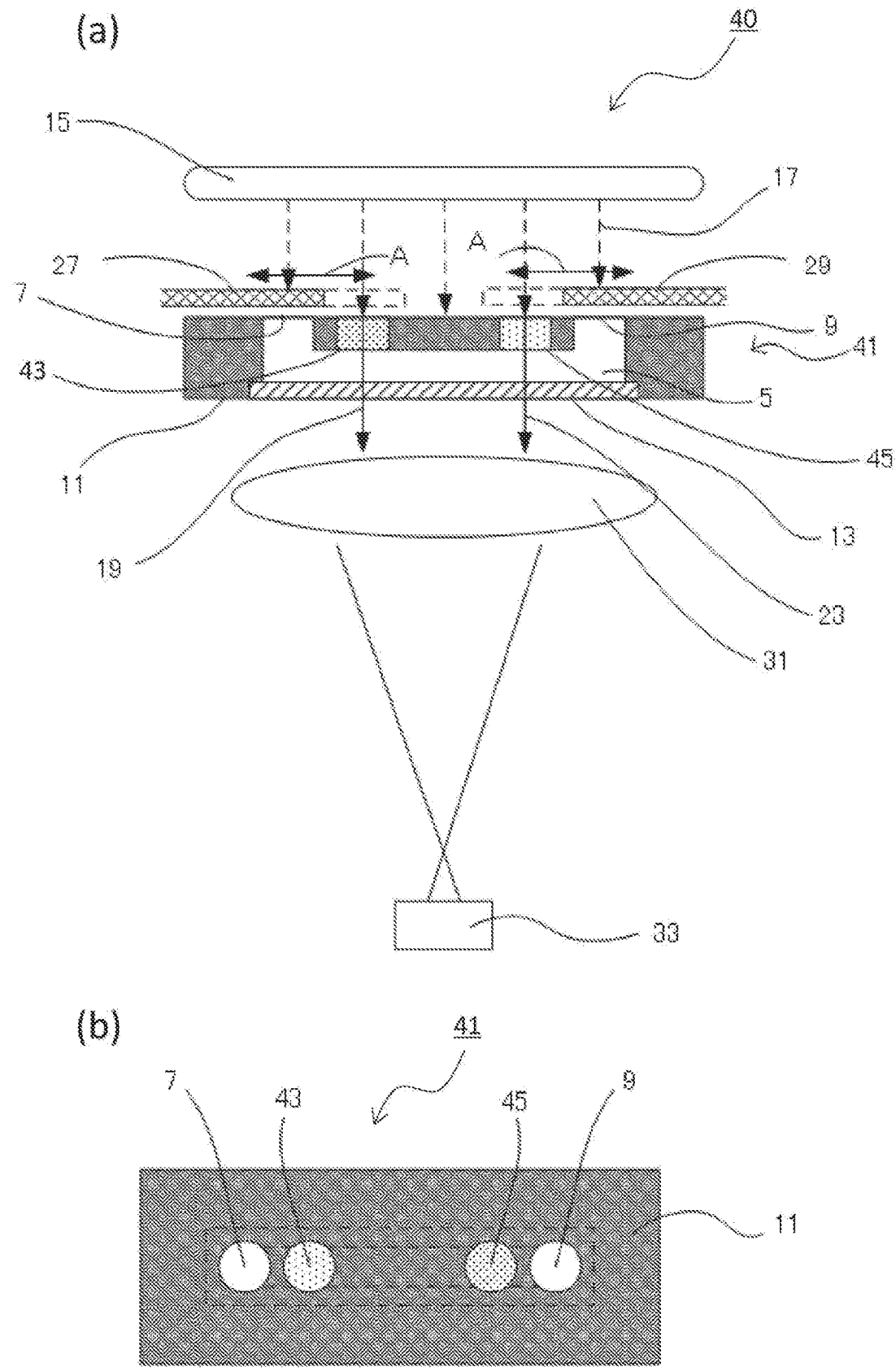
FIG. 2 is a diagram showing a configuration of an optical measurement system (example 2) according to the present invention.

FIG. 2 is a diagram showing an example of a configuration of an optical measurement system 40 comprising an optical measurement apparatus and an optical measurement microchip according to the present invention. FIG. 2A is a cross-sectional diagram showing the optical measurement system 40 including a UV lamp 15, a flow path 5, and a measurement sensor unit 33. FIG. 2B is a diagram showing the optical microchip 41 as viewed from the UV lamp 15 side. The point of difference between the example 1 and the example 2 is that, in the example 2, the optical measurement microchip 41 includes a wavelength selection member. Description will be made below regarding this point of difference.

As shown in FIG. 2A, as in the example 1, the microchip 11 according to the example 2 is formed of a silicone resin such as PDMS or the like, for example, which contains a pigment that is capable of absorbing stray light. With such an arrangement, a UV-transparent window portion 13 formed of a silicone resin that is transparent to UV light (ultraviolet light) is arranged on the bottom side of the flow path, for example. Furthermore, a first wavelength (260-nm) selection portion 43 and a second wavelength (280-nm) selection portion 45 are provided on the upper face side of the flow path facing the bottom face side thereof. The first wavelength selection portion 43 and the second wavelength selection portion 45 are each arranged such that the one face thereof faces the UV lamp 15 and such that the other face thereof forms a part of the wall of the flow path 5.

It should be noted that, when a first shutter is driven to a position at which light can be input from the UV lamp 15 to the first wavelength (260-nm) selection portion 43 as well as when the first shutter is driven to a position at which the input of such light is blocked, a shutter driving mechanism drives the first shutter 27 such that the light emitted from the UV lamp 15 is not input to an inlet 7 of the microchip 41. In the same manner, when a second shutter 29 is driven to a position at which light can be input from the UV lamp 15 to the second wavelength (280-nm) selection portion 45 as well as when the second shutter 29 is driven to a position at which the input of such light is blocked, the shutter driving mechanism drives the second shutter 29 such that the light emitted from the UV lamp 15 is not input to an outlet 9 of the microchip 41.

The optical measurement system 40 according to the example 2 provides the same effects as those provided by the optical measurement system 1 according to the example 1. In addition, the microchip 41 and the wavelength selection member are configured as a single unit, thereby allowing the apparatus to be configured with a compact size. Furthermore, by changing a given microchip to another microchip having a different wavelength selection member, such an arrangement allows measurement to be performed with a different wavelength without changing the optical measurement apparatus. With optical measurement using a conventional optical measurement apparatus, in a case in which measurement is performed with different wavelengths, there is a need to change the settings of the optical measurement apparatus, and specifically, settings of a light source, photodetectors, or the like, instead of changing such a microchip.

Example 3

Figure 3:
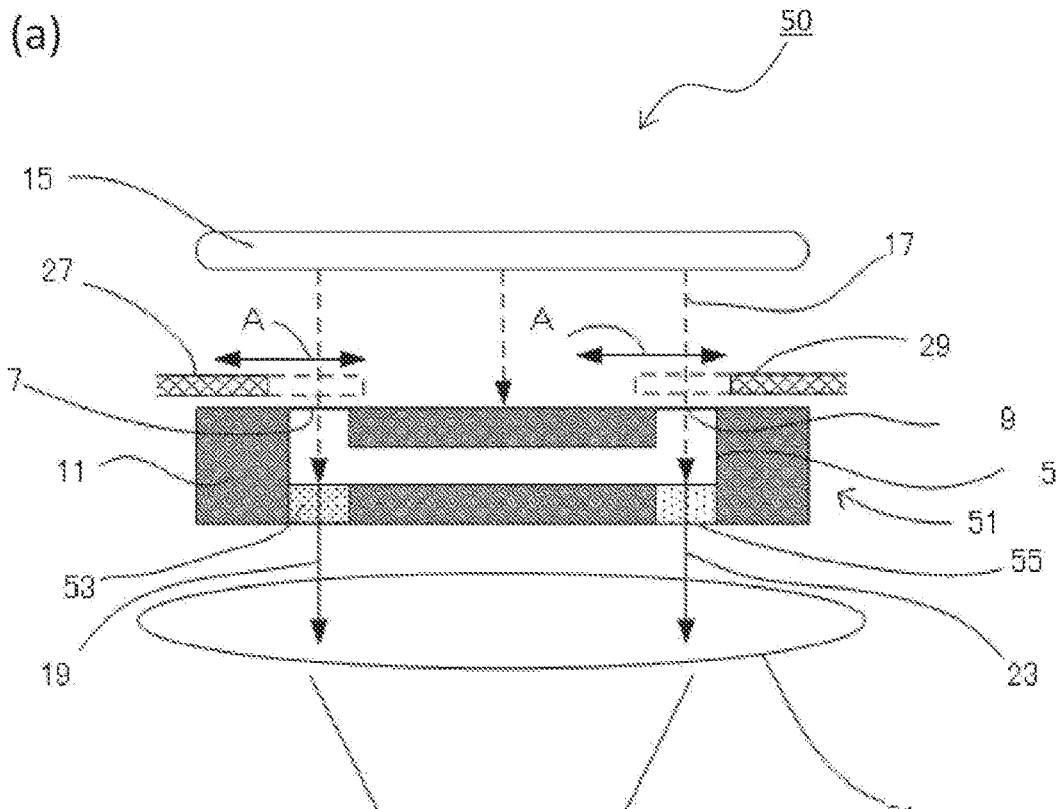
FIG. 3 is a diagram showing a configuration of an optical measurement system (example 3) according to the present invention.
Figure 3:
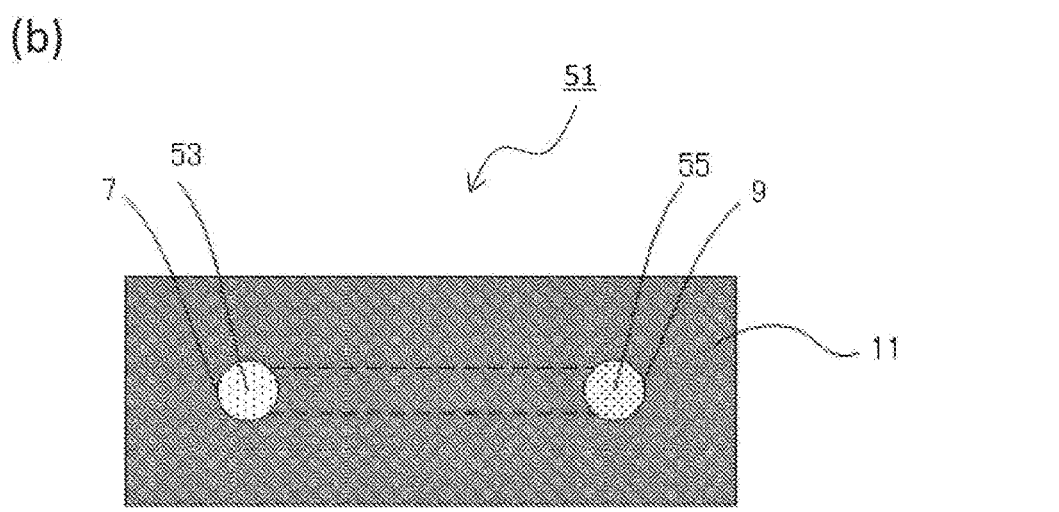

FIG. 3 is a diagram showing a configuration example of an optical measurement system 50 according to the present invention comprising an optical measurement apparatus and an optical measurement microchip. FIG. 3A is a cross-sectional diagram showing the optical measurement system 50 including a UV lamp 15, a flow path 5, and a measurement sensor unit 33. FIG. 3B is a diagram showing the optical microchip 51 as viewed from the UV lamp 15 side. The example 3 is a modification of the example 2. The point of difference between the example 2 and the example 3 is that, in the example 3, a first wavelength selection portion and a second wavelength selection portion are each arranged as a portion of the bottom face of the flow path such that they also function as a UV-transparent window portion 13. Description will be made below regarding this point of difference.

As shown in FIG. 3A, as in the example 1, the microchip main body 11 according to the example 3 is formed of a silicone resin such as PDMS or the like, for example, which contains a pigment that is capable of absorbing stray light. With such an arrangement, a first wavelength (260-nm) selection portion 53 is arranged at a position on the bottom face of the flow path 5 such that it faces the inlet 7. Furthermore, a second wavelength (280-nm) selection portion 55 is arranged at a position on the bottom face of the flow path 5 such that it faces the outlet 9.

The upper face of the first wavelength selection portion 53 and the upper face of the second wavelength selection portion 55 form a part of the bottom face of the flow path 5 within the microchip 51. Furthermore, the lower face of the first wavelength selection portion 53 and the lower face of the second wavelength selection portion 55 each function as an emission face via which light transmitted through the first wavelength selection portion 53 and light transmitted through the second wavelength selection portion 55 are to be emitted. That is to say, the other face of the first wavelength selection portion 53 and the other face of the second wavelength selection portion 55 each have the same function as that provided by the light emission face of the UV-transparent window portion 13 according to the example 2. Accordingly, with the example 3, this arrangement does not require the UV-transparent window portion 13 employed in the examples 1 and 2.

With such an arrangement, the shutter driving mechanism drives the first shutter 27 such that the light emitted from the UV lamp 15 is input to the inlet 7 of the microchip 51 or otherwise such that the input of the light to the inlet 7 is blocked. In the same manner, the shutter driving mechanism drives the second shutter 29 such that the light emitted from the UV lamp 15 is input to the outlet 9 of the microchip 51 or otherwise such that the input of the light to the outlet 9 is blocked.

The optical measurement system 50 according to the example 3 provides the same effects as those provided by the optical measurement system 40 according to the example 2. In addition, the UV-transparent window portion 13 can be omitted, thereby allowing the microchip 51 to have a more compact size. Otherwise, an arrangement may be made in which the distance which the light passes through the sample is increased by the extent of a space obtained by omitting the UV-transparent window portion.

Example 4

Figure 4:
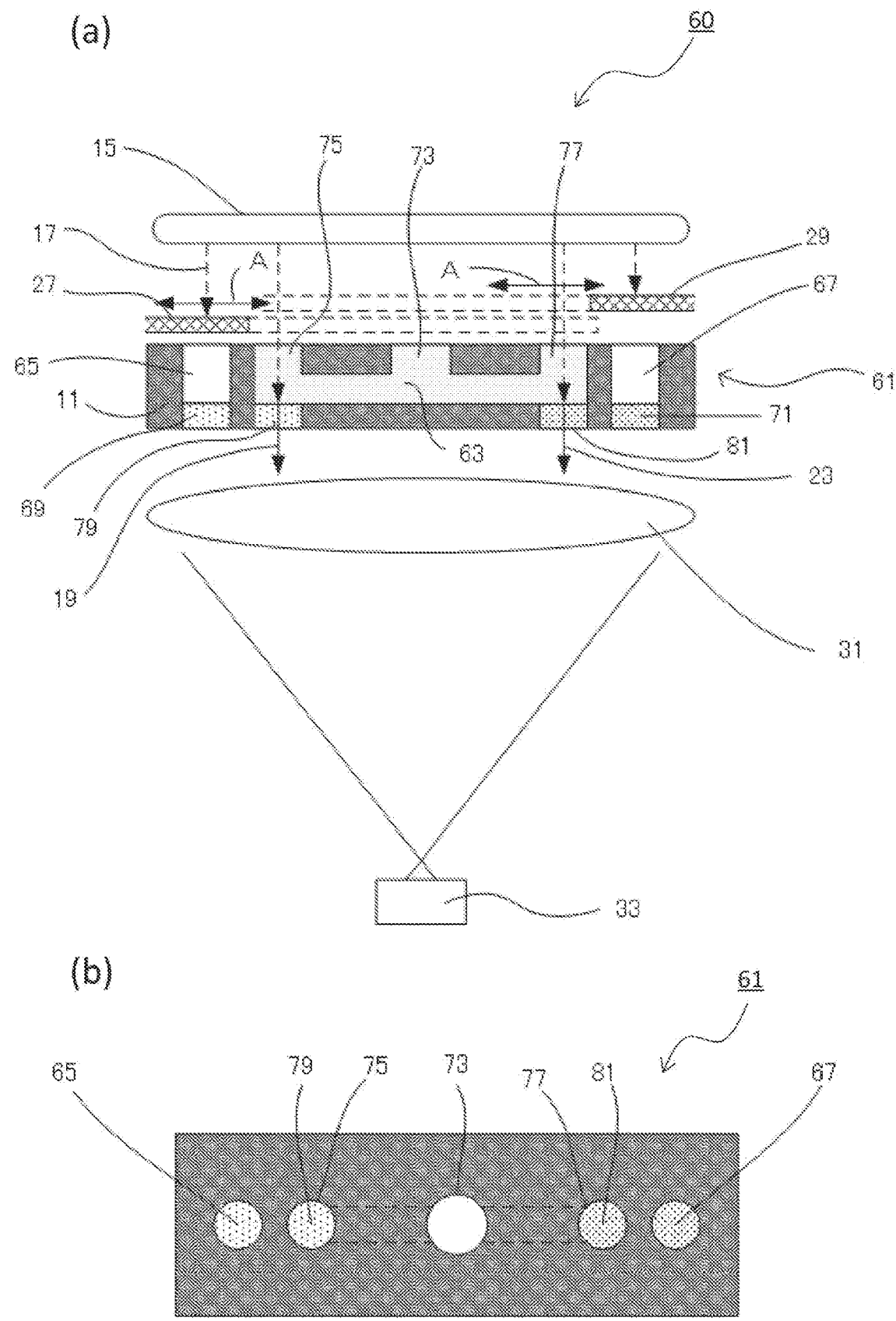
FIG. 4 is a diagram showing a configuration of an optical measurement system (example 4) according to the present invention.

FIG. 4 is a diagram showing a configuration example of an optical measurement system 60 according to the present invention comprising an optical measurement apparatus and an optical measurement microchip 61. FIG. 4A is a cross-sectional diagram showing the optical measurement system 60 including a UV lamp 15, a flow path 63, and a measurement sensor unit 33. FIG. 4B is a diagram showing the optical microchip 61 as viewed from the UV lamp 15 side. The example 4 is a modification of the example 3. The point of difference between the example 3 and the example 4 is that, in the example 4, this arrangement is capable of acquiring reference data in addition to performing light measurement of a liquid sample held within the flow path using the ultraviolet light having a wavelength of 260 nm and the ultraviolet light having a wavelength of 280 nm.

As shown in FIG. 4A, the optical measurement microchip 61 according to the example 4 is provided with a first reference light cavity 65 (an example of a "first reference light hollow portion" described in the present claims) and a second reference light cavity 67 (an example of a "second reference light hollow portion" described in the present claims) each formed on the outer side of a flow path 63 in order to acquire reference data. Furthermore, a first wavelength (260-nm) reference light selection portion 69 (an example of a "first reference light-transparent portion" described in the present claims) and a second wavelength (280-nm) reference light selection portion 71 (an example of a "second reference light-transparent portion" described in the present claims) are arranged as the bottom face of the first reference light cavity 65 and as the bottom face of the second reference light cavity 67, respectively. The first wavelength reference light selection portion 69 and the second wavelength reference light selection portion 71 are formed of the same materials as those that form the first wavelength selection portion 79 and the second wavelength selection portion 81, respectively. Furthermore, in order to provide uniform distances which the light passes through the member, the first wavelength reference light selection portion 69 and the second wavelength reference light selection portion 71 are configured to have the same thicknesses as those of the first wavelength selection portion 79 and the second wavelength selection portion 81, respectively.

Furthermore, in the example 4, the flow path 63 formed in the microchip 61 is branched such that a single inlet 73 communicates with two outlets (a first outlet 75 and a second outlet 77). It should be noted that, as in the examples 1 through 3, the flow path may be structured such that a single inlet communicates with a single outlet.

Next, description will be made regarding an example of a method for measuring DNA purity using the optical measurement system shown in FIG. 4 with a DNA-containing solution as a liquid sample. First, the optical measurement microchip 61 is prepared in a state in which a DNA-containing solution has been injected into the flow path 63 and a solvent containing no DNA (which will also be referred to as a "reference solution" hereafter) has been injected into a first well (an example of a "first reference light guide" described in the present claims) comprising the first reference light cavity 65 and the first wavelength reference light selection portion 69 and a second well (an example of a "second reference light guide" described in the present claims) comprising the second reference light cavity 67 and the second wavelength reference light selection portion 71 (Step 1). Subsequently, the microchip 61 in this state is set to a measurement position of the optical measurement apparatus (Step 2). The optical system of the optical measurement apparatus is arranged beforehand such that, when the microchip 61 is set to a predetermined position, the first wavelength light 19 that has been input to the first outlet 75 of the microchip 61 and has passed through the first wavelength selection portion 79, the first wavelength reference light that has been input to the first reference light cavity 65 and has passed through the first wavelength reference light selection portion 69, the second wavelength measurement light 23 that has been input to the second outlet 77 of the microchip 61 and has passed through the second wavelength selection portion 81, and the second wavelength reference light that has been input to the second reference light cavity 67 and has passed through the second wavelength reference light selection portion 71 are guided to the light receiving portion of the measurement sensor unit 33 by means of the focusing lens 31.

Subsequently, the first shutter 27 is inserted into a space between the UV lamp 15 and the optical measurement microchip 61 by means of an unshown shutter driving mechanism such that it is positioned so as to block the input of the light from the UV lamp 15 to the first reference light cavity 65 (Step 3). Subsequently, the second shutter 29 is inserted into the space between the UV lamp 15 and the optical measurement microchip 61 by means of the shutter driving mechanism such that it is positioned so as to block the input of the light emitted from the UV lamp 15 to the second reference light cavity 67, the second outlet 77, the inlet 73, and the first outlet 75 (Step 4). Electric power is supplied by an unshown power supply to the UV lamp 15 so as to turn on the UV lamp 15 (Step 5). The first shutter 27 is retracted by the shutter driving mechanism from a position at which it blocks the input of the light emitted from the UV lamp 15 to the first reference light cavity 65 (Step 6). As a result, light is emitted from the UV lamp 15 to the first reference light cavity 65. The light thus emitted passes through the reference solution, and the first wavelength reference light having the first wavelength is emitted from the first wavelength reference light selection portion 69. In Step 6, the first wavelength reference light emitted from the first wavelength reference light selection portion 69 is input to the focusing lens 31 configured as a light focusing mechanism. After the first wavelength reference light is focused by means of the focusing lens 31, it is input to the measurement sensor unit 33. The intensity of the first reference light (the intensity of the transmitted light that has passed through the reference solution, i.e., the blank light intensity) is measured by means of the measurement sensor unit 33 (Step 7).

Subsequently, the shutter 27 is inserted into the space between the UV lamp 15 and the optical measurement microchip 61 by means of the shutter driving mechanism such that it is positioned so as to block the input of the light emitted from the UV lamp 15 to the first reference light cavity 65 (Step 8). Subsequently, the second shutter 29 is inserted into the space between the UV lamp 15 and the optical measurement microchip 61 such that it is positioned so as to block the input of light emitted from the UV lamp 15 to the inlet 73, the second outlet 77, and the second reference light cavity 67 (Step 9). As a result, the light emitted from the UV lamp 15 is input via the first outlet 75. The light is absorbed in part and dimmed by the liquid sample held within the flow path 63, and the light thus dimmed passes through the first wavelength selection portion 79. The first wavelength measurement light 19 (having a wavelength of 260 nm) that has been absorbed in part and dimmed by the liquid sample is emitted via the first wavelength selection portion 79. In Step 9, the first wavelength measurement light 19 thus emitted from the first wavelength selection portion 79 is input to the focusing lens 31. After the first wavelength measurement light 19 is focused by the focusing lens 31, it is input to the measurement sensor unit 33. The intensity of the first wavelength measurement light 19 (the intensity of the transmitted light that has passed through the measurement sample) is measured using the measurement sensor unit 33 (Step 10).

Subsequently, the first shutter 27 is inserted into the space between the UV lamp 15 and the optical measurement microchip 61 by means of the shutter driving mechanism such that it is positioned such that it blocks the input of the light emitted from the UV lamp 15 to the first reference light cavity 65, the first outlet 75, and the inlet 73 (Step 11). Subsequently, the second shutter 29 is inserted into the space between the UV lamp 15 and the optical measurement microchip 61 by means of the shutter driving mechanism such that it is positioned so as to block the input of the light emitted from the UV lamp 15 to the second reference light cavity 67 (Step 12). As a result, the light emitted from the UV lamp 15 is input via the second outlet 77. The input light is absorbed in part and dimmed by the liquid sample held within the flow path 63, and then passes through the second wavelength selection portion 81. That is to say, the second wavelength measurement light 23 (having a wavelength of 280 nm) thus absorbed in part and dimmed by the liquid sample is emitted from the second wavelength selection portion 81. In Step 12, the second wavelength measurement light 23 thus emitted from the second wavelength selection portion 81 is input to the focusing lens 31. The second wavelength measurement light 23 thus input is focused by the focusing lens 31, and is input to the measurement sensor unit 33. The intensity of the second wavelength measurement light 23 (the intensity of the transmitted light that has passed through the measurement sample) is measured using the measurement sensor unit 33 (Step 13).

Subsequently, the first shutter 27 is inserted into the space between the UV lamp 15 and the optical measurement microchip 61 by means of the shutter driving mechanism such that it is positioned so as to block the input of the light emitted from the UV lamp 15 to the first reference light cavity 65, the first outlet 75, the inlet 73, and the second outlet 77 (Step 14). Subsequently, the second shutter 29 is retracted by means of the shutter driving mechanism from a position at which it blocks the input of the light emitted from the UV lamp 15 to the second reference light cavity 67 (Step 15). As a result, the light emitted from the UV lamp 15 is input to the second reference light cavity 67. The light thus input passes through the reference liquid, and the second wavelength reference light having the second wavelength is emitted from the second wavelength reference light selection portion 71. In Step 15, the second wavelength reference light emitted from the second wavelength reference light selection portion 71 is input to the focusing lens 31 configured as a focusing mechanism. Accordingly, the second wavelength reference light is focused by the focusing lens 31, and is input to the measurement sensor unit 33. The intensity of the second wavelength reference light (the intensity of the transmitted light that has passed through the reference liquid, i.e., the blank light intensity) is measured using the measurement sensor unit 33 (Step 16).

The first wavelength measurement light intensity value is corrected based on the data of the first wavelength reference light intensity measured in Step 7 and the first wavelength measurement light intensity measured in Step 10 (Step 17). Furthermore, the second wavelength measurement light intensity value is corrected based on the data of the second wavelength reference light intensity measured in Step 16 and the second wavelength measurement light intensity measured in Step 13 (Step 18). Subsequently, the DNA purity is measured based on Expression (1) using the first wavelength measurement light intensity corrected in Step 17 (which will be referred to as the "corrected value $A_{260}$" hereafter) and the second wavelength measurement light intensity corrected in Step 18 (which will be referred to as the "corrected value $A_{280}$" hereafter) (Step 19).

Also, for example, an unshown control unit may support the operation of the power supply that supplies electric power to the UV lamp 15, the operation of the shutter driving mechanism configured to insert/retract the first shutter 27 and the second shutter 29 into/from the space between the UV lamp 15 and the first wavelength selection portion 79 and the space between the UV lamp 15 and the second wavelength selection portion 81, the data processing for the transmitted light intensities measured by the measurement sensor unit 33, and the like.

The optical measurement system 60 according to the example 4 provides the same effects as those provided by the optical measurement apparatuses according to the examples 1, 2, and 3. In addition, the optical measurement microchip 61 to be used is provided with the reference light cavities. Accordingly, unlike conventional techniques, this arrangement does not require a procedure in which, after the blank light intensity is measured, a given optical measurement microchip is detached from the optical measurement apparatus, following which another optical measurement microchip in a state in which a liquid sample has been injected into the flow path is set on the optical measurement apparatus so as to measure the intensities of the transmitted light having a wavelength of 260 nm and the transmitted light having a wavelength of 280 nm with respect to the liquid sample. That is to say, in order to measure the intensities of the blank light and the transmitted light with respect to the liquid sample with wavelengths of 260 nm and 280 nm, such an arrangement only requires the shutters to be driven after the optical measurement microchip 61 is set on the optical measurement apparatus only once.

Figure 5:
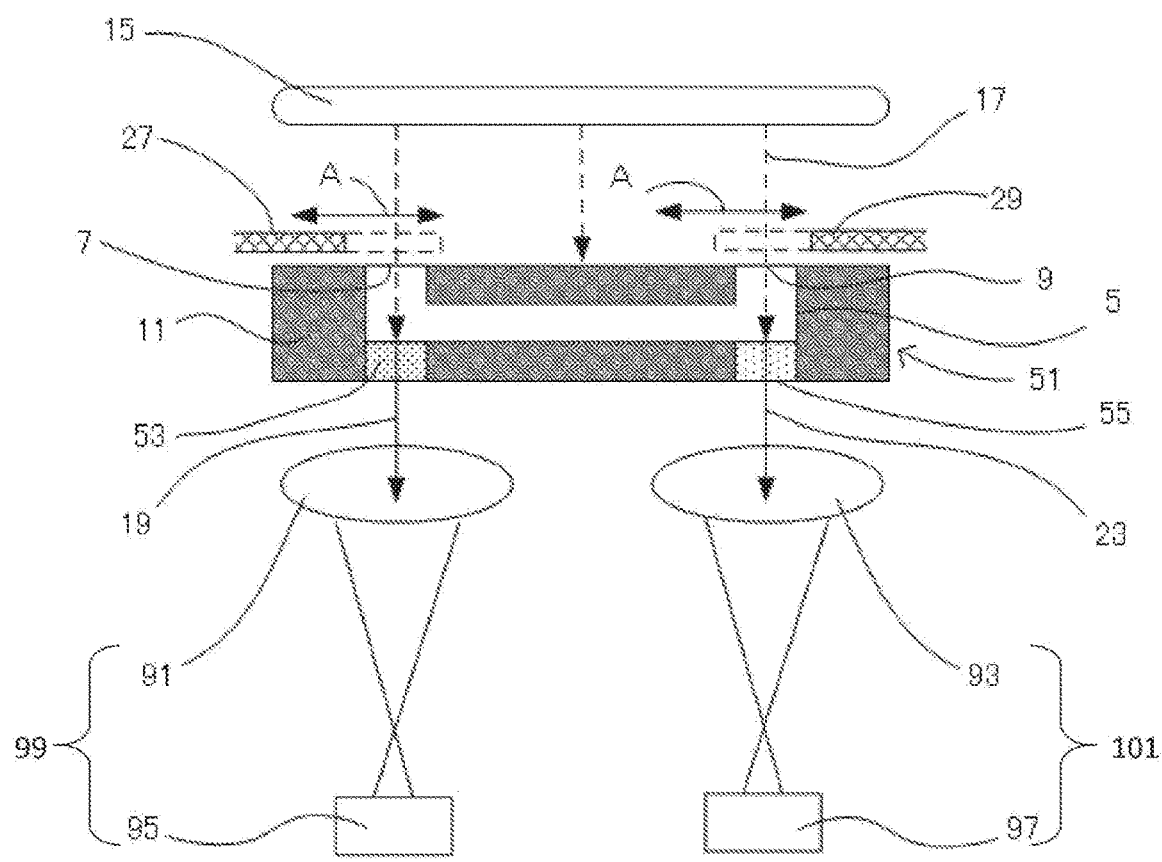
FIG. 5 is a diagram showing a configuration of an optical measurement system having a pair of optical measurement units.

It should be noted that the optical measurement apparatus according to the present invention is not restricted to those described in the examples 1 through 4. Description has been made in the examples regarding an arrangement in which the 260-nm wavelength light and the 280-nm wavelength light are measured by means of a single focusing mechanism (focusing lens) and a single measurement sensor unit. For example, as shown in FIG. 5, in order to measure the 260-nm wavelength light and the 280-nm wavelength light, the optical measurement apparatus may be provided with a pair of optical measurement units (99, 101) comprising focusing lenses (91, 93) and measurement sensor units (95, 97).

Figure 6:
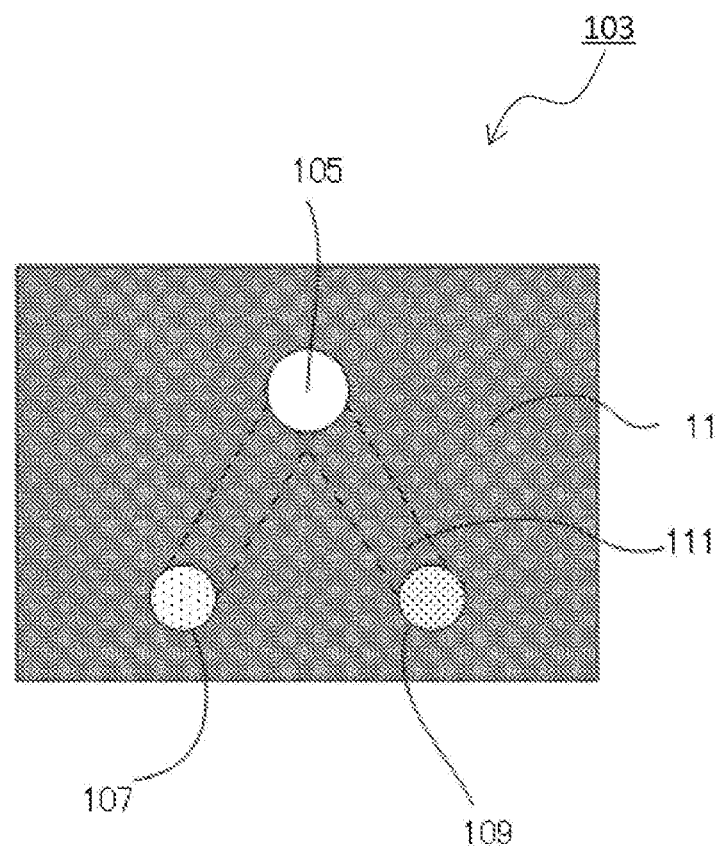
FIG. 6 is a side view of an optical measurement microchip having a V-shaped flow path as viewed from a light source side.

Description has been made in the examples 1 through 4 regarding an arrangement in which the flow path that couples the inlet and the outlet of the microchip is configured as a linear structure as viewed from the side on which the inlet and the outlet are formed in the microchip, as shown in FIGS. 2B, 3B, and 4B, for example. However, the present invention is not restricted to such an arrangement. For example, as shown in FIG. 6, the microchip 103 may be provided with a single inlet 105 and two outlets (a first outlet 107 and a second outlet 109). Also, a flow path 111 may be configured in a V-shaped structure as viewed from a side on which the inlet 105, the first outlet 107, and the second outlet 109 formed in the microchip 103.

REFERENCE SIGNS LIST

1 optical measurement system, 3 optical measurement microchip, 5 flow path, 7 inlet, 9 outlet, 11 microchip main body, 13 UV transparent window portion, 15 UV lamp, 17 UV light, 18 wavelength selection member, 19 first wavelength (260-nm) light, 21 first wavelength (260-nm) selection portion, 23 second wavelength (280-nm) light, 25 second wavelength (280-nm) selection portion, 27 first shutter, 29 second shutter, 31 focusing lens, 33 measurement sensor unit, 40 optical measurement system, 41 optical measurement microchip, 43 first wavelength (260-nm) selection portion, 45 second wavelength (280-nm) selection portion, 50 optical measurement system, 51 optical measurement microchip, 53 first wavelength (260-nm) selection portion, 55 second wavelength (280-nm) selection portion, 60 optical measurement system, 61 optical measurement microchip, 63 flow path, 65 first reference light cavity, 67 second reference light cavity, 69 first wavelength (260-nm) reference light selection portion, 71 second wavelength (280-nm) reference light selection portion, 73 inlet 75 first outlet, 77 second outlet, 79 first wavelength selection portion, 81 second wavelength selection portion, 91 focusing lens, 93 focusing lens, 95 measurement sensor, 97 measurement sensor, 99 optical measurement unit, 101 optical measurement unit, 103 microchip, 105 inlet, 107 first outlet, 109 second outlet, 111 flow path.

The invention claimed is:

1. An optical measurement system configured to perform optical measurement of a sample, comprising:
   an optical cell having a hollow portion for holding the sample; and
   a light source unit that emits a broadband light including a first light and a second light to the optical cell,
   wherein the optical cell comprises:
      a first light guide in which a light passes through a first transparent portion that allows the first light to pass through more readily than the second light and the hollow portion without passing through a second transparent portion that allows the second light pass through more readily than the first light; and
      a second light guide that differs from the first light guide, in which a light passes through the second transparent portion and the hollow portion without passing through the first transparent portion; wherein
   the optical cell is configured to have a circumferential wall portion that surrounds the hollow portion, wherein the circumferential wall portion is configured to have, as a portion thereof: a dual-wavelength-transparent portion that allows the first light and the second light to pass through; the first transparent portion; and the second transparent portion,
   wherein the first light guide is configured such that a light sequentially passes through in a direction from the light source unit in an order of the first transparent portion, the hollow portion, and the dual-wavelength-transparent portion, and
   wherein the second light guide is configured such that a light sequentially passes through in a direction from the light source unit in an order of the second transparent portion, the hollow portion, and the dual-wavelength-transparent portion.

2. An optical measurement system configured to perform optical measurement of a sample, comprising:
   an optical cell having a hollow portion for holding the sample; and
   a light source unit that emits a broadband light including a first light and a second light to the optical cell,
   wherein the optical cell comprises:
      a first light guide in which a light passes through a first transparent portion that allows the first light to pass through more readily than the second light and the hollow portion without passing through a second transparent portion that allows the second light pass through more readily than the first light; and
      a second light guide that differs from the first light guide, in which a light passes through the second transparent portion and the hollow portion without passing through the first transparent portion;
   wherein the optical cell is configured to have a circumferential wall portion that surrounds the hollow portion, wherein the circumferential wall portion is configured to have, as a portion thereof: a first opening and a second opening that connect the hollow portion to an exterior portion, wherein the first light guide is configured such that a light sequentially passes through in a direction from the light source unit in an order of the first opening, the hollow portion, and the first transparent portion, and wherein the second light guide is configured such that a light sequentially passes through in a direction from the light source unit in an order of the second opening, the hollow portion, and the second transparent portion.

3. An optical measurement system configured to perform optical measurement of a sample, comprising:
   an optical cell having a hollow portion for holding the sample; and
   a light source unit that emits a broadband light including a first light and a second light to the optical cell,
   wherein the optical cell comprises:
      a first light guide in which a light passes through a first transparent portion that allows the first light to pass through more readily than the second light and the hollow portion without passing through a second transparent portion that allows the second light pass through more readily than the first light;
      a second light guide that differs from the first light guide, in which a light passes through the second transparent portion and the hollow portion without passing through the first transparent portion;
      a first reference light hollow portion that differs from the hollow portion;
      a second reference light hollow portion that differs from both the hollow portion and the first reference light hollow portion;
      a first reference transparent portion that differs from the first transparent portion and configured to allow the first light to pass through more readily than the second light;
      a second reference transparent portion that differs from the second transparent portion and configured to allow the second light to pass through more readily than the first light;
      a first reference light guide configured to have an optical path length that is the same as that of the first light guide; and
      a second reference light guide configured to have an optical path length that is the same as that of the second light guide,
   wherein the first reference light guide is configured such that a light passes through the first reference light hollow portion and the first reference transparent portion,
   wherein the second reference light guide is configured such that a light passes through the second reference light hollow portion and the second reference transparent portion,
   wherein a distance which a light passes through the first transparent portion is equal to a distance which a light passes through the first reference transparent portion, and
   wherein a distance which a light passes through the second transparent portion is equal to a distance which a light passes through the second reference transparent portion.

4. An optical measurement system configured to perform optical measurement of a sample, comprising:
   an optical cell having a hollow portion for holding the sample; and
   a light source unit that emits a broadband light including a first light and a second light to the optical cell,
   wherein the optical cell comprises:
      a first light guide in which a light passes through a first transparent portion that allows the first light to pass through more readily than the second light and the hollow portion without passing through a second transparent portion that allows the second light pass through more readily than the first light; and
      a second light guide that differs from the first light guide, in which a light passes through the second transparent portion and the hollow portion without passing through the first transparent portion;
   wherein the optical measurement system further comprises:
   an optical shutter between the light source unit and a photodetector unit configured to detect a light emitted from the optical cell,
   wherein the optical shutter is configured to control the light so as to allow the light to pass through or otherwise so as to block the light.

5. An optical measurement system configured to perform optical measurement of a sample, comprising:
   an optical cell having a hollow portion for holding the sample; and
   a light source unit that emits a broadband light including a first light and a second light to the optical cell,
   wherein the optical cell comprises:
      a first light guide in which a light passes through a first transparent portion that allows the first light to pass through more readily than the second light and the hollow portion without passing through a second transparent portion that allows the second light pass through more readily than the first light; and
      a second light guide that differs from the first light guide, in which a light passes through the second transparent portion and the hollow portion without passing through the first transparent portion;
   wherein the first light is a light having a wavelength of 260 nm, and
   wherein the second light is a light having a wavelength of 280 nm.

* * * * *